(12) United States Patent
Magrath

(10) Patent No.: US 9,591,222 B1
(45) Date of Patent: Mar. 7, 2017

(54) OPTICAL PLATFORM SYSTEM FOR ALIGNMENT OF DIGITAL DISPLAY DEVICE TO TELESCOPE

(71) Applicant: Bernard Leo Magrath, Santa Fe, NM (US)

(72) Inventor: Bernard Leo Magrath, Santa Fe, NM (US)

( * ) Notice: Subject to any disclaimer, the term of this patent is extended or adjusted under 35 U.S.C. 154(b) by 0 days.

(21) Appl. No.: 15/045,141

(22) Filed: Feb. 16, 2016

(51) Int. Cl.
*H04N 5/225* (2006.01)
*H04N 5/232* (2006.01)
*G02B 23/16* (2006.01)

(52) U.S. Cl.
CPC ........... *H04N 5/2328* (2013.01); *G02B 23/16* (2013.01); *H04N 5/2254* (2013.01); *H04N 5/23293* (2013.01)

(58) Field of Classification Search
None
See application file for complete search history.

*Primary Examiner* — Stephen Coleman
(74) *Attorney, Agent, or Firm* — Plager Schack LLP

(57) ABSTRACT

An optical platform system is disclosed that provides alignment of a digital display device (for example a digital camera or a camera enabled smart phone) to a telescope, (for example monoculars or binoculars). The system provides a steady magnified image and mitigates blurry imaging in the digital display. An optical jack stage with x-y-z adjustability may be used to align a mounted digital display device's camera lens with the eyepiece a mounted telescope. Some embodiments may include a reflex finder to assist in the alignment of the camera lens with the eyepiece.

5 Claims, 4 Drawing Sheets

OPTICAL PLATFORM SYSTEM FOR ALIGNMENT OF DIGITAL DISPLAY DEVICE TO TELESCOPE

CROSS-REFERENCE TO RELATED APPLICATIONS

None.

BACKGROUND

The embodiments herein relate generally to alignment platforms, and more particularly, to an optical platform system for alignment of digital display device to a small telescope or binoculars.

Digital display devices such as compact digital cameras and smartphone cameras have limited ability to magnify an image. One approach to magnifying a digital device image is to place a magnifying device in front of the digital device lens. However, the main problem with existing camera/smartphone and for example, binocular combinations is that the highly magnified image is prone to camera shake which creates a blurry image.

As can be seen, there is a need for an optical platform that can alignment and hold steady the pairing of a digital device display system with a magnifying device.

SUMMARY

According to one embodiment of the subject technology, an optical platform system for alignment of a digital display device to a telescope comprises an optical bench adaptable for mounting onto an optical support; a telescope support mounted perpendicular to a top surface of the optical bench for receiving the telescope; an optical jack stage movable in at least one horizontal direction parallel to the top surface of the optical bench and movable vertically in a direction perpendicular to the top surface of the optical bench; and a digital display device support mount coupled to the optical stage for holding the digital display device, the digital display device supported by the optical jack stage to align a lens of the digital display device with an eyepiece of the telescope.

According to another embodiment, an optical platform system for alignment of a digital display device to a telescope comprises an optical bench adaptable for mounting onto a tripod; an objective mount including a first plate body mounted perpendicular to a top surface of the optical bench for receiving an objective lens portion of the telescope; an eyepiece mount including a second plate body mounted perpendicular to the top surface of the optical bench for receiving an eyepiece portion of the telescope, wherein the first plate body is of equal height from the top surface of the optical bench as the second plate body and wherein the first plate body is parallel to the second plate body; an optical jack stage movable in at least one horizontal direction parallel to the top surface of the optical bench and movable vertically in a direction perpendicular to the top surface of the optical bench; a digital display device support mount coupled to the optical jack stage for holding the digital display device, the digital display device support mount including a support plate to brace the digital display device and a recess in the plate providing an aperture between a lens of the digital display device and an eyepiece of the telescope, the digital display device supported by the optical stage to align the lens with the eyepiece; and a reflex finder mounted to the optical bench positionable to mark a reference point in the eyepiece to align the lens with the reference point.

BRIEF DESCRIPTION OF THE FIGURES

The detailed description of some embodiments of the present invention is made below with reference to the accompanying figures, wherein like numerals represent corresponding parts of the figures.

DETAILED DESCRIPTION OF CERTAIN EMBODIMENTS

Figure 1:
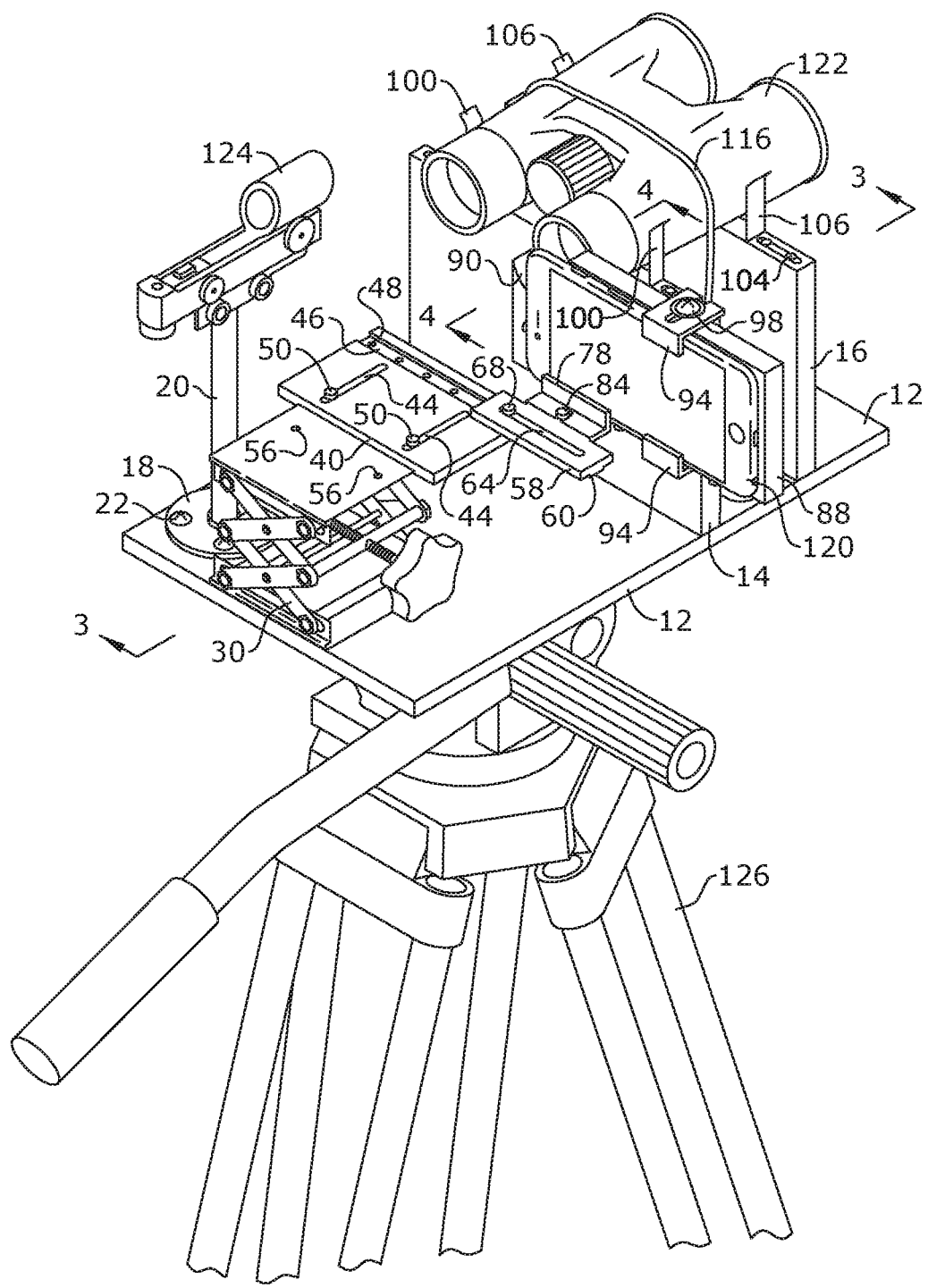
FIG. 1 is a top perspective view of an optical platform system in accordance with an exemplary embodiment of the subject technology.
Figure 2:
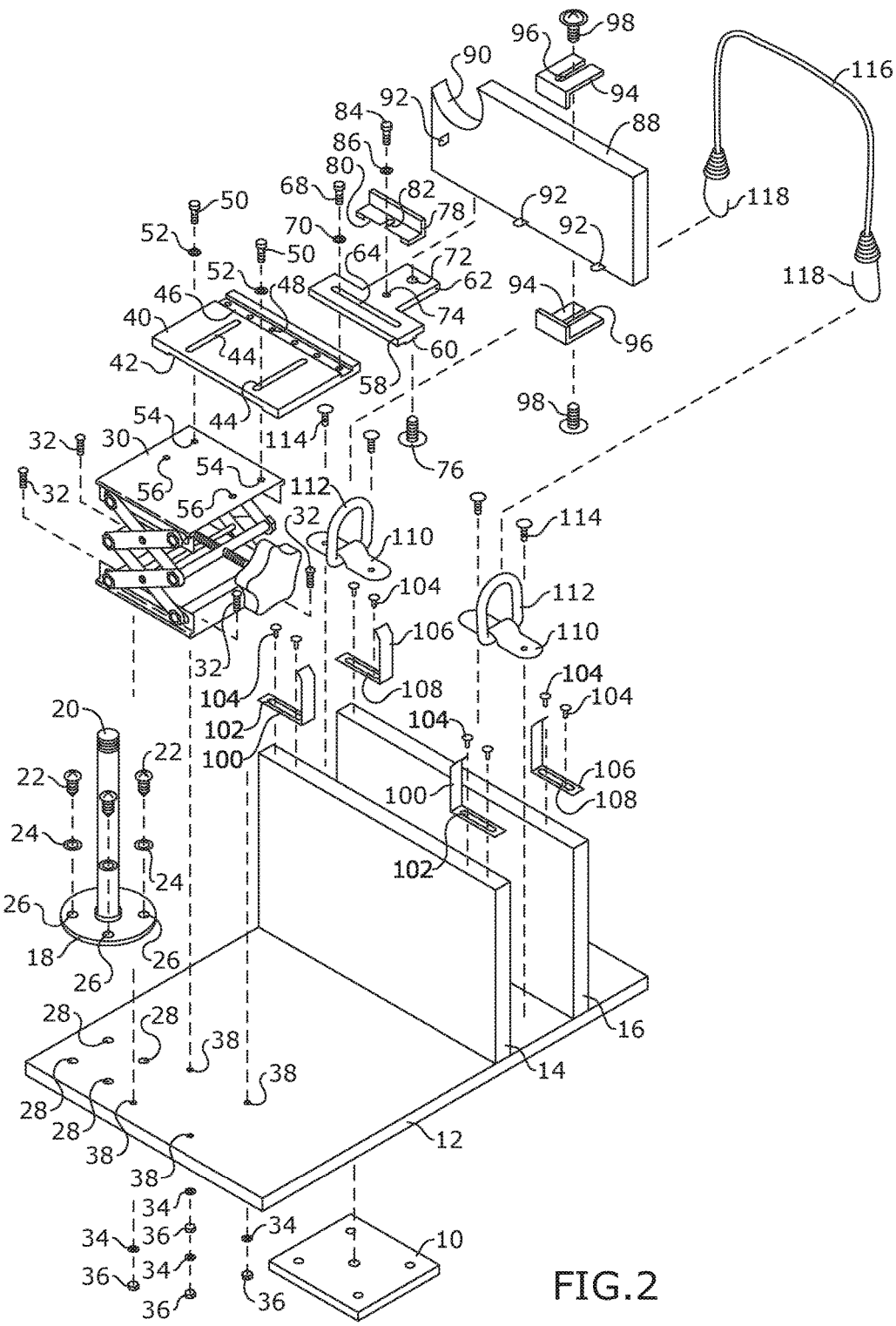
FIG. 2 is an exploded view of the system of FIG. 1 without the tripod.

The word "exemplary" is used herein to mean "serving as an example or illustration." Any aspect or design described herein as "exemplary" is not necessarily to be construed as preferred or advantageous over other aspects or designs.

In general, exemplary embodiments provide an optical platform system (referred to generally as "the system") that couples a digital display device to a telescope for a magnified and steady image captured by the telescope shown on the digital display. Referring to FIGS. 1, 2, 4, and 6, an exemplary embodiment an optical platform system is shown in use to support and align a digital display device 120 with a telescope 122 on an optical support 126. The digital display device 120 may be for example a compact digital camera with display or a smartphone with a camera function and display. The telescope 122 may be for example a monocular type or a pair of binoculars. The optical support 126 may be for example a tripod. In general, aspects of the system align the camera lens 130 of the digital display device 120 with the eyepiece lens 128 of the telescope 122. In operation, the line of sight 146 of the image of an object captured by the telescope 122 is magnified and captured by the camera lens 130 of the digital display device which can be transferred therein to the digital display. The following provides details of an exemplary embodiment of components that support the digital display device 120 and the telescope 122 and align the two to maintain a steady image on the display.

Figure 3:
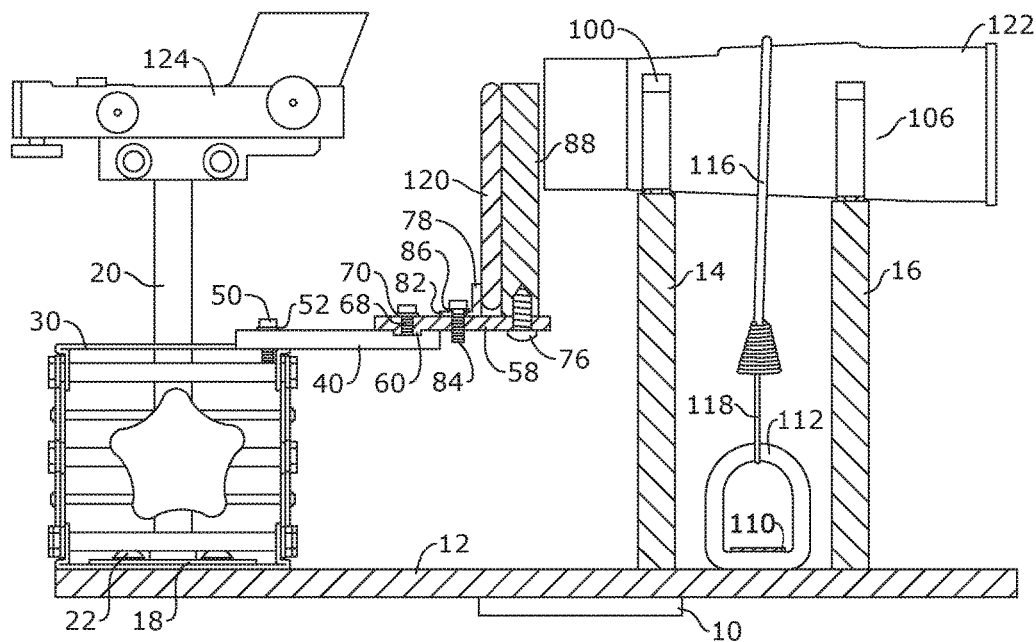
FIG. 3 is a cross-sectional side view taken along the line 3-3 of FIG. 1.
Figure 4:
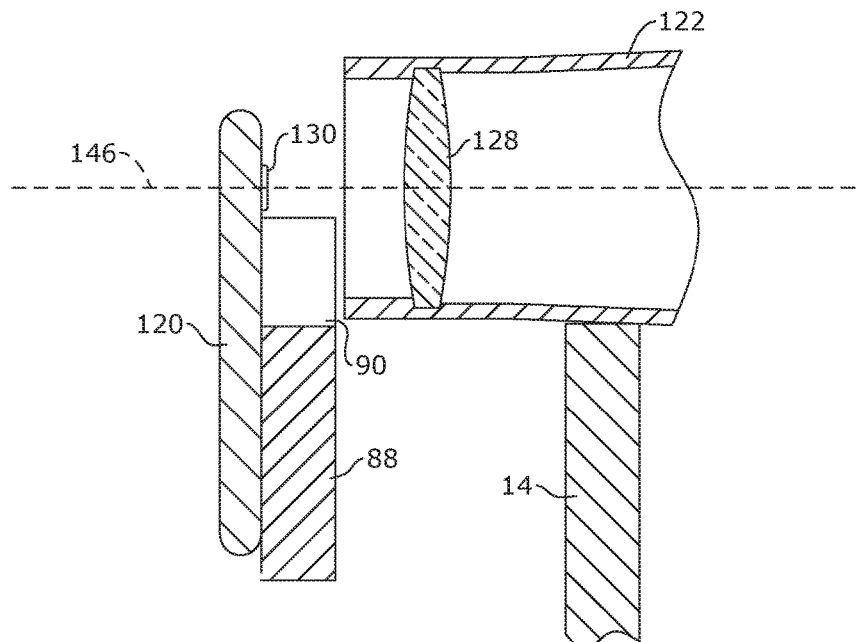
FIG. 4 is a cross-sectional side view taken along the line 4-4 of FIG. 1.
Figure 5:
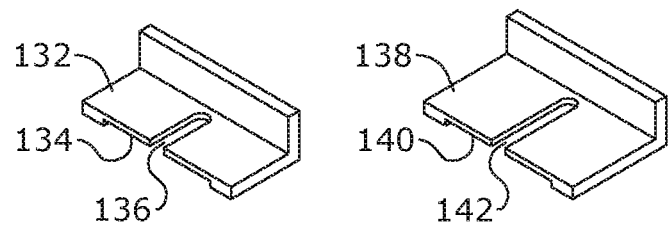
FIG. 5 is a top perspective view of alternate embodiments of digital display support mount components.
Figure 6:
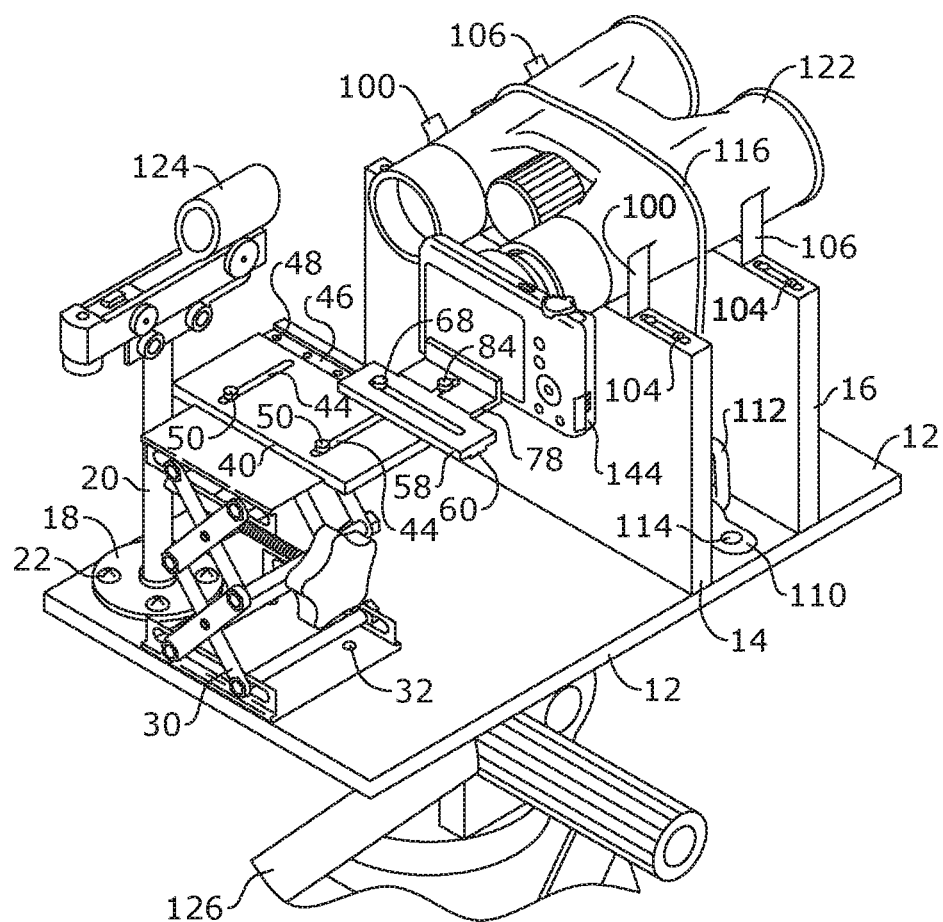
FIG. 6 is a top perspective view of the system of FIG. 1 with an optical jack stage mount in a raised position.

The system may include an optical bench 12 mountable to the optical support 126. The telescope 122 may be mounted onto a support comprising a plate 14 for the eyepiece portion of the telescope 122 and onto a plate 16 for the objective lens portion of the telescope 122. The plates 14 and 16 plate may be of equal heights from the top surface of the optical bench 12 and may be spaced from one another and in parallel. Some embodiments may include clips 100 to secure the telescope 122 to the plate 14 and clips 106 to secure the telescope 122 to the plate 16. Some embodiments may include a bungee cord 116 hooked onto D-rings 110 (FIG. 3) to aid in securing the telescope onto the plates 14 and 16. A digital display device support may include a support plate 88 and a clip(s) 94 securing the digital display device 120 to the plate 88 with the aid of screws 98. In some embodiments the support plate 88 may include a recess 90 providing an aperture between the camera lens 130 and the eyepiece.

An optical jack stage 30 may be mounted onto the optical bench 12 to align the digital display device 120 into position with the telescope 122. The optical jack stage 30 may be movable in at least one horizontal direction parallel to the top surface of the optical bench 12 and movable vertically in a direction perpendicular to the top surface of the optical bench 12. For example, the optical jack stage 30 may be coupled to the support plate 88 by coupling a y-axis adjustment plate 40 to the optical stage 30 and coupling an x-axis adjustment plate 58 to the y-axis adjustment plate 40 and to the support plate 88. The y-axis adjustment plate 40 may include slots 44 that provide horizontal position adjustment of the support plate 88 toward or away from the telescope 122 which provides centering of the image of the exit pupil captured by the digital display device when centered with the eyepiece. The position along this y-axis may be secured by set screws 50 clamping the plate 40 to stage threaded holes 56. The x-axis adjustment plate 58 may include a slot 64 that is perpendicular to the slots 44 providing horizontal position adjustment of the support plate 88 laterally in front of the eyepiece. A set screw 68 may secure the x-axis adjustment plate 58 to the y-axis adjustment plate 40. The optical stage 30 may include a jack to adjust vertical positioning of the support plate 88 (along with the x-axis adjustment) so that the camera lens 130 may be centered within the eyepiece.

Referring now to FIGS. 1-4 and 6, some embodiments may include a reflex finder 124 mounted to the optical bench 12 which is positionable to mark a reference point in the eyepiece to align the camera lens 130 with the reference point. The reflex finder 124 may be mounted to a stand 20 whose base 18 is secured to the optical bench 12 via screws 22. The reflex finder 124 displays an unmagnified field of view overlaid with an illuminated red dot. In operation, the red dot is aligned to the center of a subject image on the digital display device.

Persons of ordinary skill in the art may appreciate that numerous design configurations may be possible to enjoy the functional benefits of the inventive systems. Thus, given the wide variety of configurations and arrangements of embodiments of the present invention the scope of the present invention is reflected by the breadth of the claims below rather than narrowed by the embodiments described above.

Terms such as "top," "bottom," "front," "rear," "above," "below" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference. Similarly, an item disposed above another item may be located above or below the other item along a vertical, horizontal or diagonal direction; and an item disposed below another item may be located below or above the other item along a vertical, horizontal or diagonal direction.

What is claimed is:

1. An optical platform system for alignment of a digital display device to a telescope, comprising:
   an optical bench adaptable for mounting onto an optical support;
   a telescope support mounted perpendicular to a top surface of the optical bench for receiving the telescope;
   an optical jack stage movable in at least one horizontal direction parallel to the top surface of the optical bench and movable vertically in a direction perpendicular to the top surface of the optical bench; and
   a digital display device support mount coupled to the optical stage for holding the digital display device, the digital display device supported by the optical stage to align a lens of the digital display device with an eyepiece of the telescope.

2. The optical platform system of claim 1, further comprising a reflex finder mounted to the optical bench positionable to display a reference point aligned with a center of a field of view of the digital display device.

3. The optical platform system of claim 1, wherein the digital display device support mount includes a support plate to brace the digital display device and a recess in the plate providing an aperture between the lens and the eyepiece.

4. The optical platform system of claim 1, wherein telescope support includes an objective mount for an objective lens portion of the telescope and an eyepiece mount for an eyepiece portion of the telescope, the objective mount and eyepiece mount comprising respectively a plate body of equal heights from the top surface of the optical bench and being spaced from one another in parallel.

5. An optical platform system for alignment of a digital display device to a telescope, comprising:
   an optical bench adaptable for mounting onto a tripod;
   an objective mount including a first plate body mounted perpendicular to a top surface of the optical bench for receiving an objective lens portion of the telescope;
   an eyepiece mount including a second plate body mounted perpendicular to the top surface of the optical bench for receiving an eyepiece portion of the telescope, wherein the first plate body is of equal height from the top surface of the optical bench as the second plate body and wherein the first plate body is parallel to the second plate body;
   an optical jack stage movable in at least one horizontal direction parallel to the top surface of the optical bench and movable vertically in a direction perpendicular to the top surface of the optical bench;
   a digital display device support mount coupled to the optical jack stage for holding the digital display device, the digital display device support mount including a support plate to brace the digital display device and a recess in the plate providing an aperture between a lens of the digital display device and an eyepiece of the telescope, the digital display device supported by the optical stage to align the lens with the eyepiece; and
   a reflex finder mounted to the optical bench positionable to display a reference point aligned with a center of a field of view of the digital display device.

\* \* \* \* \*